W. D. EWART.
Drive-Chain.

No. 196,115. Patented Oct. 16, 1877.

William D. Ewart,
Inventor.
By Coburn & Thacher
Attys.

Witnesses:
Heinrich F. Barnes,
L. M. Harris,

UNITED STATES PATENT OFFICE.

WILLIAM D. EWART, OF CHICAGO, ILLINOIS, ASSIGNOR TO EWART MANUFACTURING COMPANY, OF SAME PLACE.

IMPROVEMENT IN DRIVE-CHAINS.

Specification forming part of Letters Patent No. 196,115, dated October 16, 1877; application filed January 15, 1876.

*To all whom it may concern:*

Be it known that I, WILLIAM DANA EWART, of Chicago, in the county of Cook and State of Illinois, have invented a new and useful Improvement in Drive-Chains, which is fully described and claimed in the following specification, reference being had to the accompanying drawings, in which—

Figure 1:
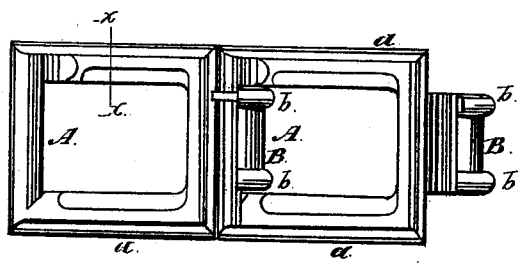
Figure 2:
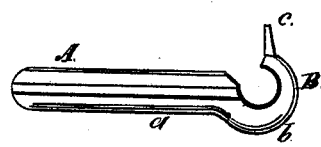
Figure 3:
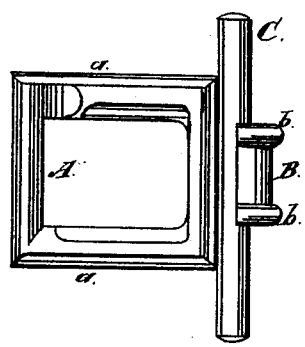

Figure 1 represents a front view of the links of the chain standing upon their sides; Fig. 2, an edge view of a link; Fig. 3, a link with an iron core, around which the hook is cast; and Fig. 4, a sectional view, taken on the line $x\ x$, Fig. 1, and showing the contour of the sides.

The object of my invention is to improve the construction of the link described in Letters Patent No. 154,594, granted to me September 1, 1874, and reissued April 20, 1875.

The invention consists in casting the link with the hook in permanent form, and also in casting a small projection upon the hook, which may be turned down around the end of the link for a fastening.

In constructing the link described in my patent of September 1, 1874, I make the piece intended for the hook angular in form, and then bend the end of this piece down to give the hook the proper form after casting the links.

This bending of the hook after casting, however, weakens it, and I have found, after experiment, that I can cast the link A with the hook B in permanent form, as shown in the drawings, so that no change is made in the form of the link after the link leaves the mold.

Figure 4:
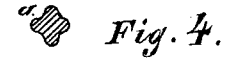

The sides of the link I make fluted, as seen at $a$, so that they will appear in cross-section, as represented in Fig. 4, and the hook I provide with ribs $b\ b$, as shown in Figs. 1 and 3.

As an additional precaution there may be cast upon the end of the hook B a small projection, $c$, of soft metal, which may be turned down around the end of the link, clasped by the hook, as shown in Fig. 1, so as to prevent the links from being detached. The use of this device is optional, however, for without it the attachment of the links is sufficiently secure for ordinary purposes.

If desired, the hook of the link may be cast upon a chill by the introduction into the mold of the metallic core C.

In making the link and hook as described I secure certain valuable results. By casting the hook in permanent form, the cost of manufacture is reduced by saving the labor and time expended in bending and the waste occasioned by breakage.

The links may also be made of metal which will not admit of bending, and the inner surface of the hook can be cast upon a chill, so as to secure a perfectly-fitting joint and a hard wearing-surface.

The hook may also be cast with ribs, so as to brace it against stretching, which is the principal objection to the use of chains for transporting power.

The ribs on the hook also serve to guide the chain upon the wheels, the sprockets of which may be made to wear entirely between these ribs.

Having thus described my invention, what I claim as new, and desire to secure by Letters Patent, is—

1. A link for drive-chains, having a central opening to receive the sprockets or teeth of the drive-wheels, provided with an open hook cast thereon, and adapted to be coupled to or uncoupled from other centrally-open links without bending the hook, substantially as described.

2. The hook B, provided with ribs $b\ b$, substantially as and for the purposes set forth.

3. A sprocket-link for drive-chains, constructed with an open hook, B, on one end bar, and a small supplementary strip of soft metal, $c$, attached to the hook, so that it may be bent down across the opening of the latter in coupling links together, substantially as described.

WILLIAM DANA EWART.

In presence of—
 H. C. WHITNEY,
 HEINRICH F. BRUNS.